United States Patent [19]

Claude

[11] 4,450,711

[45] May 29, 1984

[54] METHOD OF AND DEVICE FOR REMOTELY DETECTING LEAKS IN A FLUID-CONVEYING PIPE-LINE SUBMERGED WITHIN AN AMBIENT FLUID AND PIPE-LINE PROVIDED WITH SUCH A DETECTION DEVICE

[75] Inventor: Jean Claude, Rambouillet, France

[73] Assignee: Technigaz, France

[21] Appl. No.: 322,588

[22] Filed: Nov. 18, 1981

[30] Foreign Application Priority Data

Nov. 24, 1980 [FR] France .................. 80 24892

[51] Int. Cl.$^3$ .............................................. G01M 3/28
[52] U.S. Cl. .................. 73/40.5 R; 73/40.7; 340/605
[58] Field of Search ................ 73/40.5 R, 40.7; 340/605

[56] References Cited

U.S. PATENT DOCUMENTS

| | | | |
|---|---|---|---|
| 3,184,958 | 5/1965 | Eaton | 73/40.5 R |
| 3,191,427 | 6/1965 | Rapson, Jr. | 73/40.5 R |
| 3,276,247 | 10/1966 | Bunn | 73/40.5 R |
| 3,339,415 | 9/1967 | Wild | 73/40.5 R |
| 3,402,596 | 9/1968 | Woodruff | 73/40.7 |
| 3,802,456 | 4/1974 | Wittgenstein | 73/40.5 R X |
| 3,943,965 | 3/1976 | Matelena | 137/340 |
| 4,259,553 | 3/1981 | Tanaka et al. | 73/40.5 R X |

FOREIGN PATENT DOCUMENTS

| | | |
|---|---|---|
| 2012260 | 3/1970 | France . |
| 2215577 | 8/1974 | France . |
| 2404837 | 9/1977 | France . |

*Primary Examiner*—Gerald Goldberg
*Assistant Examiner*—Joseph W. Roskos
*Attorney, Agent, or Firm*—Steinberg & Raskin

[57] ABSTRACT

A pipe-line for conveying a fluid submerged in an ambient fluid medium has an inner conveying tube surrounded by an outer tube radially spaced from the inner tube and defining a continuous annular space therebetween. A leak conductor communicating with a leak collector and surrounding the inner conveying tube conducts leaks of conveyed fluid to the leak collector. The leak collector has a reduced cross-section and is divided into adjacent sections isolated in a fluid-tight manner relative to each other and extending throughout the length of the tube. Each of the sections has at least a single valve automatically opened by predetermined pressure of the conveyed fluid leaks for providing communication with the annular space surrounding the inner tube. A leak detecting system in the annular space includes a sweeping device for sweeping the annular space with an auxiliary fluid and an analyzing device for analyzing the composition of the auxiliary fluid at one accessible end of the pipe-line and at spaced locations along the pipe-line. A warning device connected to the analyzing device is operable when the analyzing device indicates a predetermined condition.

9 Claims, 8 Drawing Figures

METHOD OF AND DEVICE FOR REMOTELY DETECTING LEAKS IN A FLUID-CONVEYING PIPE-LINE SUBMERGED WITHIN AN AMBIENT FLUID AND PIPE-LINE PROVIDED WITH SUCH A DETECTION DEVICE

BACKGROUND OF THE INVENTION

The present invention relates essentially to a method of and device for remotely detecting leaks or like defects in fluid-tightness in a pipe-line or a like feeder main conveying any fluid whatsoever and submerged within an ambient or surrounding fluid as well as to a pipe-line or duct provided with such a detection device.

More particularly the invention is applicable to the remote detection of leaks or like defects in fluid-tightness of an underwater pipe-line or like submarine duct for carrying a fluid such as a liquefied gas or the like between a land location on shore of a coastal area and an off-shore location far away in the sea for the loading and/or unloading of a ship such as, for example, a tanker ship.

Submarine fluid-carrying or feeder pipe-lines for enabling a ship to be unloaded and/or loaded at a location substantially far away from the shore are already known. In case of a leak or like defect in fluid-tightness in such a feeder pipe-line, resulting in leaks of one of the conveyed or ambient fluids towards the other, it is not known how to continuously and remotely detect such leaks and moreover after having ascertained the existence of a leak on a length of the pipe-line it is not known how to accurately locate it without any manual inspection of the whole length of the pipe-line.

According to the known state of prior art indeed when it was found that a pipe-line exhibited a leak or like defect in fluid-tightness thereof it was then necessary to send an operator for inspecting the whole length of the pipe-line with a view to detecting such a defect in fluid-tightness and the leak of one of the fluids. It is therefore obvious that such an inspection of the pipe-line taking place in a medium or environment relatively hostile to man, namely deep within the sea, was very difficult to be carried out and required much time and a significant infrastructure. On the other hand, as the fluid-conveying submarine pipe-lines are generally lined or covered with a coating or sheath of concrete the operator was often compelled to damage such a protective layer in order to detect and locate the leak or leaks of one of the fluids.

SUMMARY OF THE INVENTION

The object of the present invention is to solve all these problems by providing an approach which makes it possible to remotely detect and locate continuously the defects in fluid-tightness or leaks of such a transmission pipe-line.

The approach is according to the present invention a particular self-acting method for automatically detecting defects in fluid-tightness or leaks of a fluid-confining or holding enclosure, which consists, for a pipe-line carrying any fluid whatsoever and submerged within an ambient fluid, in remotely detecting a leak of one of the fluids towards the other one. The method comprises at least two preferably substantially simultaneous or concomitant respective steps of local leak detection and overall leak detection performed on the whole pipe-line.

Thus according to the process of detecting defects in fluid-tightness or leaks according to the invention it is possible to quickly detect a leak occurring in the whole length of the pipe-line through an overall detection and to locate such a leak by means of a local detection. Furthermore such a double leak detection makes it possible to remove any risk of mistake due to an abnormal operation of one of these overall or local detections.

According to another characterizing feature of the invention said overall detection step consists in constantly surrounding the pipe-line with a confined layer of an auxiliary sweeping fluid interposed between said pipe-line and the ambient or surrounding fluid, said auxiliary fluid being at a pressure lower than the respective pressures of the conveyed fluid and of the ambient fluid and being constantly kept flowing throughout the whole length of said pipe-line. This overall detection step consists also in detecting the presence of at least one of the conveyed or ambient fluids, respectively, within said auxiliary fluid by means of a continuous watch on or control of the composition of the flow of auxiliary fluid issuing from an accessible end of the pipe-line.

According to still another characterizing feature of the invention, said auxiliary fluid is a simple possibly inert gas or a mixture of gases at least the main component of which is possibly an inert gas and preferably nitrogen.

Thus according to the invention an analysis of the stream of auxiliary fluid exiting from an accessible end of the pipe-line may be easily carried out for detecting the presence of the ambient or conveyed fluid within said auxiliary fluid without it being necessary to move around within the environment or ambient medium.

According to a further characterizing feature of the invention, the process is applicable to a pipe-line embedded in a layer of solid material surrounded by the auxiliary fluid wherein any leak of the conveyed fluid is channelled or guided generally in a circumferential direction along the wall of said pipe-line so as to store said fluid within a continuous and relatively reduced volume or space extending along said pipe-line and wherein the stored leak is at least partially transferred to said auxiliary fluid.

According to still another characterizing feature of the invention, the method consists in performing the transfer of the collected or gathered leaking conveyed fluid towards the layer of auxiliary fluid when the pressure of the stored leaking conveyed fluid reaches a determined value.

According to another characterizing feature of the present invention the step of locally detecting the leak of the conveyed fluid consists in confining the gathered leak of conveyed fluid by dividing the storage voltage or space into adjacent sections isolated in sealing relationship from each other, in detecting the presence of the conveyed fluid within each aforesaid section and in case of presence of said conveyed fluid in emitting a signal for giving an alarm or operating a warning device. The signal, which corresponds to the presence of leaking conveyed fluid within at least one of the sections, is advantageously emitted when the pressure of the fluid carried within said section reaches a determined value.

According to a further characterizing feature of the invention, the local detection of the presence of the ambient or surrounding fluid within said auxiliary fluid consists in detecting at points statistically distributed over the length of the pipe-line and corresponding substantially to the local low points of said pipe-line the presence of ambient fluid and in emitting a signal in case of detection to give an alarm or operate a warning device.

A signal is advantageously emitted when the level of the ambient fluid locally stored within the space for confining said auxiliary fluid reaches a determined value.

The present invention is also directed to a pipe-line for conveying or feeding any fluid whatsoever and submerged within a fluid environment or ambient medium, which according to the invention, comprises local detection means and overall detection means for detecting a leak of one of the fluids towards the other one.

The pipe-line or duct according to the invention comprises an inner in particular metallic conveying tube surrounded by an outer preferably metallic tube radially spaced from the inner tube and defining a continuous annular space therebetween throughout the length of the pipe-line. According to the invention, the means for overall detection of a leak of one of the fluids towards the other one comprise said annular space, means for sweeping or scavenging said annular space with an auxiliary fluid, means for analysing the composition of the exiting flux of said auxiliary fluid at an accessible end of said pipe-line and alarm or warning means connected to said analysing means.

According to a preferred embodiment of the invention, the pipe-line is of the kind comprising an externally heat-insulated or lagged conveying tube and a preferably impervious shell, casing, sheath or like envelope of small thickness surrounding the heat-insulation or lagging in contacting relationship therewith and it comprises according to the invention, interposed between said conveying tube and the heat-insulation or lagging, a device for channelling or guiding or directing the leaks of the conveyed fluid and a device for collecting said guided or channelled leaks communicating with the guiding device. According to the invention, the collecting device has advantageously a reduced cross-section extending over the whole length of the tube and is provided with at least one member for putting it into communication with said annular space surrounding said heat-insulated tube. This member is according to a preferred embodiment of the invention a valve opened automatically by the pressure prevailing within said collecting device.

According to another characterizing feature of the invention, said channelling or guiding device consists of at least one layer of fabric or cloth resistant to the conveyed fluid and wrapped or wound continuously about the conveying tube. According to the invention, this fabric is advantageously a glass fiber fabric with free loops and with a taffeta weave.

Moreover, said collecting device is according to the invention a substantially trough-shaped duct secured onto said fabric and filled with a porous material such as for instance a polyurethane foam with burst cells or the like. The envelope, shell or casing defining said collecting device is made from a plastics material withstanding pressure so as to avoid any straining or deformation of said collecting device during the building or manufacture of the pipe-line.

The pipe-line according to the invention is moreover characterized in that said collecting device is divided into longitudinally successive adjacent sections isolated in sealing relationship from each other and there is provided means for locally detecting any leak of the conveyed fluid, comprising said sections and at least one detector arranged on each aforesaid independent section, said detector being connected to alarm or warning means and advantageously being according to the invention a pressostat or like pressure controller.

The division of said collecting device according to the invention into independent sections of reduced lengths with respect to the overall length of the pipe-line makes possible an accurate remote location of the leaks of the conveyed fluid and accordingly that detection enables an operator to effect a quick pinpoint intervention on the stop for coping with or stopping said leak of the conveyed fluid.

The pipe-line according to the invention is moreover characterized in that the means for locally detecting any leak of the ambient fluid comprise detectors for sensing the presence of ambient fluid within the annular space, which are arranged within said annular space while being distributed throughout the length of the pipe-line at positions corresponding substantially to the local low points of said pipe line, said detectors being connected to alarm or warning means.

According to the invention, these detectors for sensing the presence of fluid are advantageously detectors sensing the level of the ambient fluid locally gathered within the annular space, said detectors emitting a signal transmitted to the alarm means when the local level of the accumulated ambient fluid reaches a determined value.

The fluid-conveying pipe-line, submerged within an ambient or surrounding fluid such as in particular a submarine pipe-line for carrying a liquefied gas, as provided by the invention, makes it possible to detect and to locate remotely in a reliable manner the defects in fluid tightness or leaks of the pipe-line owing to the dual device for detecting such defects or failures.

Moreover, in case of a leak of little significance of one of the conveyed or ambient fluids towards the other one, it is possible according to the invention to stop such a leak by building up an overpressure within the annular space interposed between the ambient fluid and the conveyed fluid without requiring any human intervention on the portion of submerged pipe-line.

BRIEF DESCRIPTION OF THE DRAWINGS

For a fuller understanding of the invention reference is had to the following description, taken in connection with the accompanying drawings, in which.

DESCRIPTION OF PREFERRED EMBODIMENTS

With reference to the accompanying drawings and more particularly to FIGS. 1, 2, 3, 4 and 5 the construction of a fluid-carrying pipe-line 1 submerged within an ambient fluid according to the invention and comprising means for remote local detection and remote overall detection of defects in fluid-tightness of said pipe-line will now be described.

Figure 1:
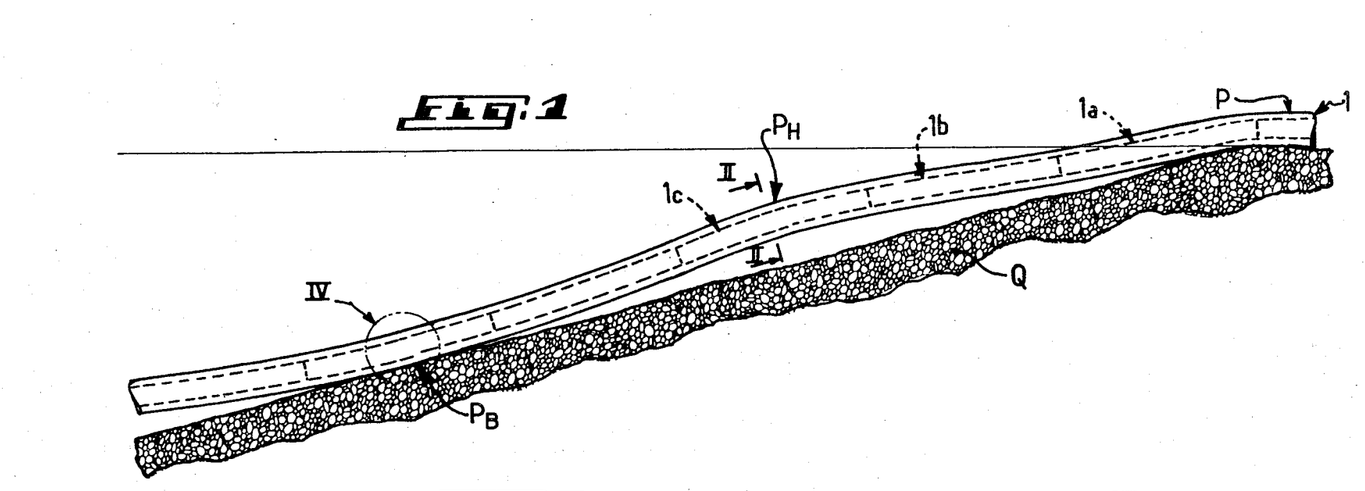
FIG. 1 is a general diagrammatic layout illustrating the positioning of a fluid-conveying pipe-line according to the invention on a sea bed or bottom.

Referring to the drawings, FIG. 1 shows the positioning of a submarine duct or pipe-line 1 carrying a fluid such for instance as a liquefied petroleum gas onto the sea bed or bottom Q between a point located off-shore or far away at sea (not shown) for unloading and/or loading a cargo ship and a point on land or ashore P of a coastal area. As a general rule and as partially shown in FIG. 1, a submarine pipe-line 1 rests on the sea bottom Q while exhibiting a wavy shape or undulations of small amplitude and it therefore exhibits throughout its length high points $P_H$ and low points $P_B$. By way of exemplary illustration for an underwater pipe-line of a length of 3,500 m the amplitude of the waves or undulations is about 2 m on an average and the frequency or pitch thereof is about 150 m.

Figure 2:
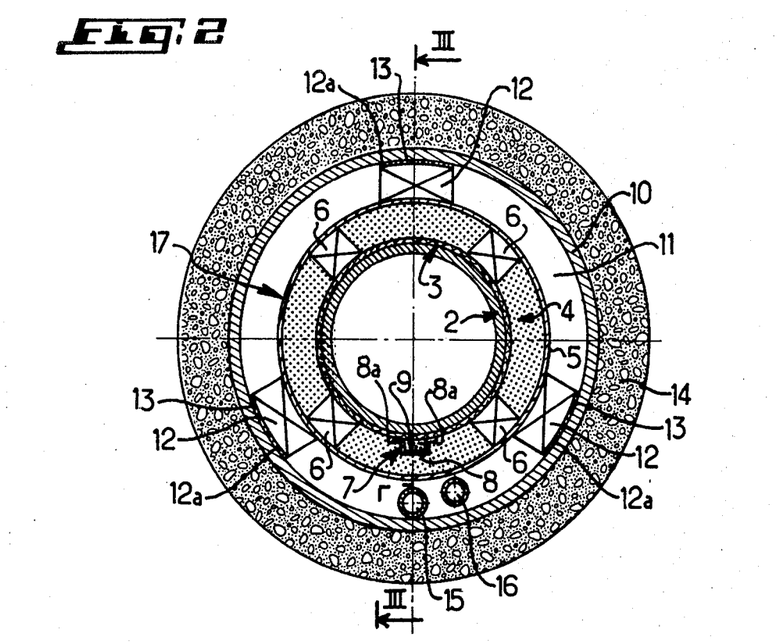
FIG. 2 is a cross-sectional view, on an enlarged scale, taken along the lines II—II, of FIG. 1 and illustrating an embodiment of the pipe-line according to the invention.

With reference to FIG. 2, the fluid-conveying duct 1 according to a preferred embodiment of the invention comprises an inner metallic pipe or tube 2 for carrying liquefied petroleum gas. The conveying tube 2 is embedded into a layer 4 of a material exhibiting suitable qualities of heat-insulation and mechanical strength for lagging or heat-insulating the conveying tube or pipe 2. By way of example, there may be used polyurethane injected as a dense or compact foam. Moreover said layer 4 of heat-insulating material is surrounded by an impervious envelope or sheath 5 of small thickness. This impervious sheath consists of steel sheets or foils wrapped or wound spirally with preferably overlapping turns and welding thereof together whereas for tubes or pipes of smaller diameters the sheath is made from a plastic material such as polyethylene, for example.

As shown in FIG. 2, it is advantageous to provide centering pads or studs 6 about said conveying tubes 2 so that said impervious sheath or casing 5 may be easily wrapped or wound around and the heat-insulating material may be injected within the space defined between the tube 2 and the impervious sheath 5.

Figure 3:
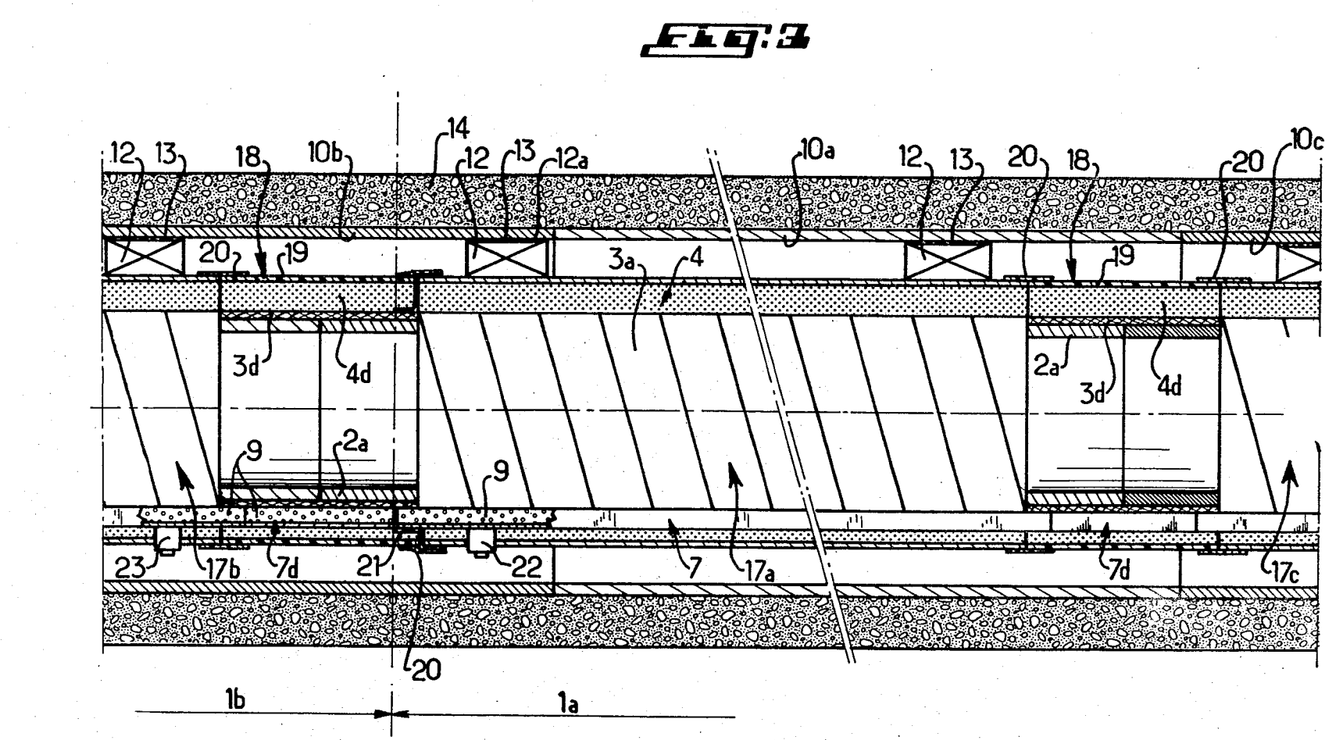
FIG. 3 is an axial-sectional view, taken along the lines III—III of FIG. 2 and showing in particular the structure of the pipe-line according to the invention at the connection of two pipe or duct elements and at the junction of two independent adjacent sections of the device for collecting the leaks of the conveyed fluid.

According to a significant feature of the invention, the conveying tube 2 is covered externally by at least one fabric layer 3 in contacting relationship therewith which is spirally wrapped or wound thereabout preferably with the turns 3a thereof partially overlapping each other (FIG. 3). According to the invention, it is advantageous to adhesively bond or stick the fabric layers 3 onto the outer wall of the conveying tube 2 by means of a thin layer of resin, for example, a layer of epoxy resin.

According to the invention, it is advantageous that the fabric layer 3 be made from a strip of preferably silicon-coated glass fiber fabric with free or exposed loops and taffeta weave. The free or exposed loops of the glass fiber fabric provide indeed for a greatly improved adhesion or bonding of the lagging 4 onto the surface of said fabric. Moreover, the taffeta weave allows a better drainage of the possible leaks of the conveyed fluid.

According to the invention, the duct 1 also comprises throughout its length a collecting or draining device 7 for gathering the leaks of the conveyed fluid which are conducted or guided by the glass fiber layer 3. This collecting device consists of a casing or channel 8 having its free edges formed with fastening lugs, tongues or like flanges 8a for adhesively bonding or sticking same onto the glass fiber layer preferably at the lower portion of the tube 2 and along a longitudinal generating line of said duct.

According to the invention, the draining means 7, is advantageously filled with a porous material 9 such as, for example, a polyurethane foam with burst or open cells.

Furthermore, the casing or channel-like envelope 8 of the draining means should be made from a material capable of withstanding pressure, for example, from a plastics material so as to prevent same from being strained or deformed during the setting or polymerization of the heat-insulating material 4 injected into the space defined between the glass fiber fabric layer 3 and the impervious sheath 5.

According to the invention the fluid conveying pipe-line or duct also comprises an outer metallic shell or envelope 10 or like external tube so as to define an annular space 11 between said outer tube 10 and the impervious sheath or shell 5.

For the purpose of properly and readily positioning the assembly or system consisting of the conveying tube 2, the glass fiber fabric layer 3, the lagging 4 and the impervious sheath 5 and referred hereinafter as duct element 17, positioning members or sprags, pads or like blocks 12 are arranged on the outer surface of said duct elements and the outer tube 10 is positioned about said sprags or pads. It is advantageous to provide on the surface 12a of contact of the pads or sprags 12 with the outer tube 10 a film or thin layer of material 13 having a small coefficient of friction so as to facilitate the relative motions between the duct element 17 and said outer tube 10.

It should be pointed out that without departing from the gist of the invention the duct element 17 and the outer tube 10 may be concentric or eccentric with respect to each other so as to increase the width of the annular space 11 at any place of the pipe-line and preferably at its lower portion.

Moreover, the pipe-line 1 comprises as known per se an outer guard or protective layer 14 consisting of a concrete coating. This concrete coating is also used as a ballasting weight for the pipe-line 1 so as to keep it laying on the sea bottom Q.

According to the invention the pipe-line 1 comprises at least two ducts arranged within the annular space 11. According to the embodiment shown on FIG. 2, the duct 16 which extends throughout the length of the pipe-line is a duct for carrying the flow of auxiliary fluid used for sweeping or scavenging the annular space 11. The duct 15 preferably located at the lowermost portion of the pipe-line constitutes the device for removing or discharging the ambient fluid possibly accumulated or gathered within said annular space. This discharging device will be described hereinafter in greater detail The method of building a pipe-line according to the invention will now be described with reference to FIGS. 2 and 3.

It is obvious that the whole length of the pipe-line is made on a building site on land by welding end-to-end several duct elements 17 and several sections of outer tube 10 as shown in FIG. 3. FIG. 3 indeed shows a portion of the pipe-line 1 according to the invention including a first duct element 17a and the end parts of two duct elements 17b, 17c welded to the respective ends of the duct element 17a, and likewise sections of outer tube 10a, 10c and 10b for making the outer envelope 10 of the pipe-line. FIG. 3 also shows the arrangement of the pads 12 along said pipe-line.

The construction of a duct element such as, for example, the duct element 17a will now be described with reference to FIG. 3. This duct element 17a comprises a central portion and two short portions at each end thereof. As shown in FIG. 3, the central portion of this duct element has the same structure as the structure shown in FIG. 2 and defined previously. It is however preferable that the drain 7a slightly extend beyond or project from each end of said central portion. Both end parts of the element 17a consist of a portion of the metal tube 2a. It is therefore easy to weld together both end parts of both adjacent duct elements, for example, the end parts of the duct element 17a and the duct element 17c so as to make the conveying tube 2.

In order to provide a pipe-line structure which is substantially continuous throughout its length the ends of each duct element 17a, 17c are covered with a connecting member 18.

As shown in FIG. 3, the connecting member 18 comprises a layer of glass fiber fabric 3d adhesively bonded or stuck onto the end portions of the ducts 17a and 17c for carrying out the junction between the glass fiber fabric layers 3a and 3c, respectively, of the duct elements 17a, 17c. Onto said glass fiber fabric layer 3d is adhesively bonded or glued a drain element 7d so as to connect the drain means 7a of the duct element 17a to the drain means 7c of the duct element 17c. About the assembly is then laid a layer of heat-insulating material 4d consisting of two half-shells or cups tightly clamped together by means of an outer envelope or sleeve 9 preferably consisting of a heat-retractable material. The layer of lagging 4d may also be made like the layer 4a by injecting a polyurethane foam between the fabric layer 3d and an outer metal envelope (not shown in the Figures).

Moreover, in order to complete fluid-tightness the sleeves 20 of small widths are adhesively bonded or stuck about the line of junction between the adjacent layers of lagging 4a, 4d and 4c. These sleeves may be made either from a thin metal sheet or foil or from a sheet of plastics material.

The sections of outer tube 10a, 10b and 10c are welded end-to-end so as to form the outer tube 10 of the pipe-line 1.

Furthermore, there is provided an expansion joint (not shown in the Figures) mounted onto the inner steel tube 2 and distributed over the whole length of the pipe-line according to the principle described for instance in the applicant's French patent specification publication No. 2,362,330.

According to a particular feature of the invention and as diagrammatically shown in FIG. 1, the composite structure consisting of the layer 4 of lagging and the drain 7 is divided into adjacent longitudinally successive sections 1a to 1x isolated in fluid-tight relationship from each other. According to the preferred embodiment of the invention these sections comprise several duct elements 17a, 17c, . . . and consist, for example, of six duct elements forming a duct length of about 72 m.

FIG. 3 shows the separation between two adjacent sections such, for example, as 1a and 1b. This separation according to a preferred embodiment of the invention is achieved by securing or fastening a closure sleeve 21 onto one of the ends of the drain 7a and of the lagging 4a of the end duct element 17a of the section 1a.

As shown in FIG. 3, the end of the section 1b consists of a duct element 17b devoid of any closure sleeve 21. The other end of the section 1a (not shown in the Figures) is like the end of the section 1b shown in FIG. 3 and similarly the other end of section 1b (not shown in the Figures) is like the end of the section 1a depicted in FIG. 3.

Moreover, each independent section 1a, 1b, 1c, . . . , 1x comprises a duct element 17a onto which has been mounted an automatically opening valve 22 for providing communication between the drain 7 of the section 1a and the annular space 11. The opening of the valve is controlled or operated by the pressure prevailing within the drain 7 of the section 1a. It is advantageous to adjust the valve opening for a pressure low enough to prevent the lagging 4 from coming unstuck or separating from the inner conveying tube 2.

Moreover, each independent section 1a, 1b, 1c, . . . , 1x comprises a duct element as illustrated in FIG. 3, i.e. the duct element 17b onto which is secured a detector 23 or so-called pressostat or pressure controller sensing any increase in pressure. This detector senses any pressure increase within the drain 7 of the corresponding section, i.e. the section 1b in FIG. 3.

It is obvious that without departing from the scope of the invention, every independent section may comprise several valves 22 and/or several pressure controllers or pressostats 23. Furthermore, the pressostats or pressure controllers 23 and valves 22 may be positioned anywhere along the length of the independent section involved. According to a preferred embodiment of the invention, it is however advantageous to arrange a pressostat or pressure controller 23 near one end of a section and a valve 22 near the other end of said section.

Figure 4:
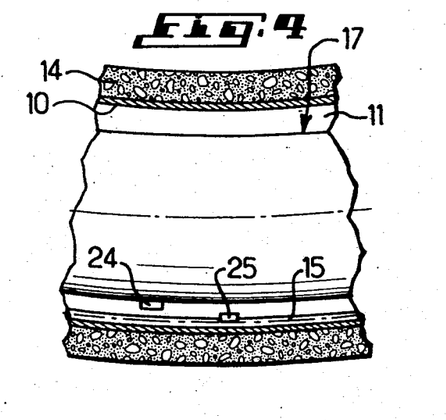
FIG. 4 is an axial-sectional view, on an enlarged scale, through the part IV of FIG. 1, showing a first preferred embodiment of the means for discharging or removing the ambient fluid according to the invention.
Figure 5:
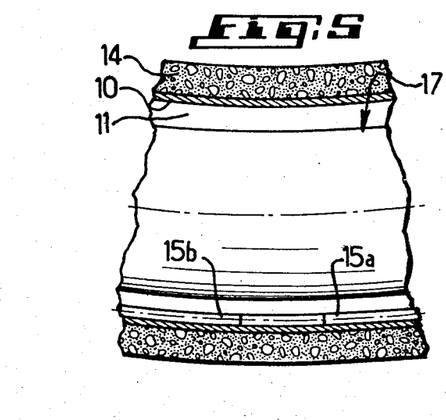
FIG. 5 is a view similar to FIG. 4 and showing a second preferred embodiment of the ambient fluid removing or discharging means according to the invention.

According to another particular feature of the invention and with reference to FIGS. 3, 4 and 5, level detectors 24 are mounted on the impervious envelope 5. According to an embodiment of the invention, these level detectors such as, for example, contact-making or switching floats are statistically distributed over the whole length of the pipe-line so as to be located at the probable low points $P_B$ (FIG. 1) of the pipe-line.

It is of course obvious that connecting cables or wire leads connect the different level detectors 24 and the different pressostats or pressure controllers 23 to a signal receiver or alarm or warning means.

Both preferred embodiments of the means for removing or discharging the ambient fluid possibly accumulated within the annular space 11 will now be described with reference to FIGS. 4 and 5. According to a first embodiment shown in FIG. 4 and in FIG. 2, these discharge means consist of a tube 15 arranged at the lowermost portion of the annular space 11. This tube extends throughout the length of the pipe-line and provides for the removal through pumping or the like of the gathered ambient fluid. This discharge tube is provided with plungers or valves 25, the opening of which is remote-controlled by a self-acting device such as, for example, a heat controlling device or so-called calorstat or a hydraulic servo-valve device. In a manner similar to the level detector 24 such drain traps or units are statistically distributed throughout the length of the discharge tube 15 so that they be positioned substantially at a low point $P_B$ (FIG. 1) of the pipe-line 1.

According to a second embodiment shown on FIG. 5, the means for removing or discharging the ambient fluid possibly stored within the annular space 11 consist of several syphon tubes 15a, 15b, 15c, . . . of small diameters. These syphon tubes are arranged in the lowermost part of the annular space 11 and each syphon tube connects two successive low points $P_B$ of the pipe-line 1. As shown in FIG. 5, the outlet of a syphon tube 15a is located downstream of the inlet of the following or next syphon tube 15b.

After these different elements have been assembled and mounted at a working site on land, said pipe-line 1 is embedded in a protective concrete layer 14 and the pipe-line 1 is submerged into the environment or surrounding medium according to a well-known process.

Figure 6:
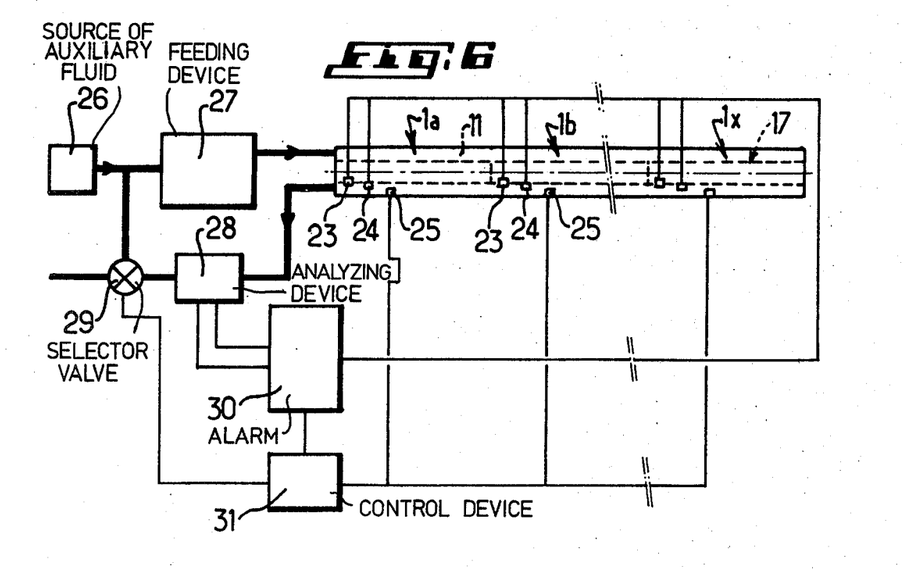
FIG. 6 is a block diagram illustrating the arrangement for remotely detecting the defects in fluid-tightness of a fluid-conveying pipe-line according to the principle of the invention.

The means of overall detection and local detection of the defects in fluid-tightness of the pipe-line 1 according to the invention will now be described more particularly with reference to FIG. 6. In this Figure, the thick or heavy connecting lines represent the circuit of auxiliary fluid and the thin or fine connecting lines represent either the alarm signal transmission connections or the control signal transmission connections.

According to the invention, the overall detection of defects in fluid-tightness of the pipe-line 1 consists in sweeping or scavenging the annular space 11 with an auxiliary fluid a major part of which consists of nitrogen.

According to a preferred embodiment of the invention, a system for overall detection of defects in fluid-tightness comprises a source of auxiliary fluid 26 consisting either of a supply of gas or of a nitrogen-generating air distillating apparatus. The source of auxiliary fluid 26 is connected to a feeding device 27 consisting advantageously of a pump or compressor for feeding the auxiliary fluid into the annular space 11 with a variable flow rate and under an adjustable pressure. The stream of auxiliary fluid will issue from the pipe-line 1 through the agency of a flow duct 16 extending throughout the length of the pipe-line and having an outlet at the accessible end of said pipe-line near the point P (FIG. 1). The flow duct 16 is connected to means 28 for analysing and controlling the composition of the exiting flux of auxiliary fluid. In the case of a submarine pipe-line carrying liquefied petroleum gas such analysing means consist advantageously of an infra-red-radiation spectrometer for detecting traces of moisture within the auxiliary gas and of an explodimeter for determining in terms of percentage the lower limit of explodability of the conveyed fluid possibly contained within the auxiliary fluid. Then the flux of auxiliary gas may be either re-cycled into the sweeping circuit or removed by means of a selector valve 29 according to whether the detection by the analysing means 28 is negative or positive, respectively.

It should be understood that the analysing means 28 described hereinabove are given by way of exemplary illustration only and may be substituted for by any equivalent analysing means without departing from the gist of the invention.

Moreover, the analysing means 28 are connected to an alarm or warning system 30 for triggering or starting a control device 31 with a view to operating the selector valve 29 in particular.

According to a preferred embodiment of the invention, the local detection of defects in fluid-tightness of the pipe-line 1 comprise at first an ambient fluid level detector 24 mounted within said annular space 11. These level detectors 24 transmit a signal in case of local accumulation of ambient fluid within the annular space 11 to the alarm or warning device 30 connected to the control device 31 for actuating the ambient fluid removal means. Such fluid discharge or draining means consist either of the draining duct 15 and drain cocks or units 25, the syphon tubes 15a, 15b, or a suction means (not shown in the Figures) for drawing the ambient fluid.

The means for local detection of defects in fluid tightness according to the invention also comprise pressure controllers or so-called pressostats 23 mounted in each section 1a, 1b, 1c, . . . , 1x of the pipe-line 1. In a manner similar to the level detectors, these pressure controllers or so-called pressostats 23 feed a signal to the alarm or warning device in case of a leak of the conveyed fluid.

The process of remotely detecting defects in fluid-tightness of the pipe-line 1 according to the invention will now be described with reference in particular to FIGS. 7 and 8.

There will be described at first with reference more particularly to FIG. 7, the operation of the remote detection of defects in fluid-tightness of the inner conveying tube 2 or in other words of the leaks of the conveyed fluid.

As previously described, the conveying tube 2 is preferably heat-insulated with epoxy resin having closed cells hence of dense or compact character. According to the invention, the leaking conveyed fluid follows the path of travel of least resistance offered by the glass fiber fabric layer 3. In view of the pressure of conveyed fluid and of its weight, the latter fluid will collect and accumulate within the corresponding drain section 7. The glass fiber fabric by guiding or conducting the leaks of the conveyed fluid into the drain avoids an increase in the pressure between the conveying tube 2 and the lagging 4 at any point of the pipe-line; such an increase in pressure could possibly cause said heat-insulating layer 4 to come unstuck or detached and to be damaged.

The accumulation of the leaking conveyed fluid within the drain section 7, for example, in the drain 7a corresponding to the section 1a of the pipe-line, induces an increase in pressure within said drain section. Therefore the valve 22 is opened by that pressure and enables the leaking conveyed fluid to escape into the annular space 11. The valve 22 is advantageously set or adjusted to a pressure low enough to prevent the highest pressure prevailing within the drain 7 from causing the insulation layer to come unstuck or be separated from the inner tube 2, the set pressure being, for example, about 2 bars.

Accordingly, when the pressure of the leaking conveyed fluid accumulated within a drain section 7 reaches a certain value the fluid would move out and pollute the auxiliary fluid sweeping or scavenging the annular space 11 and on the other hand the pressure controller or pressostat 23 of said drain section would emit a signal conveyed to the alarm means 30.

Figures 7, 8:
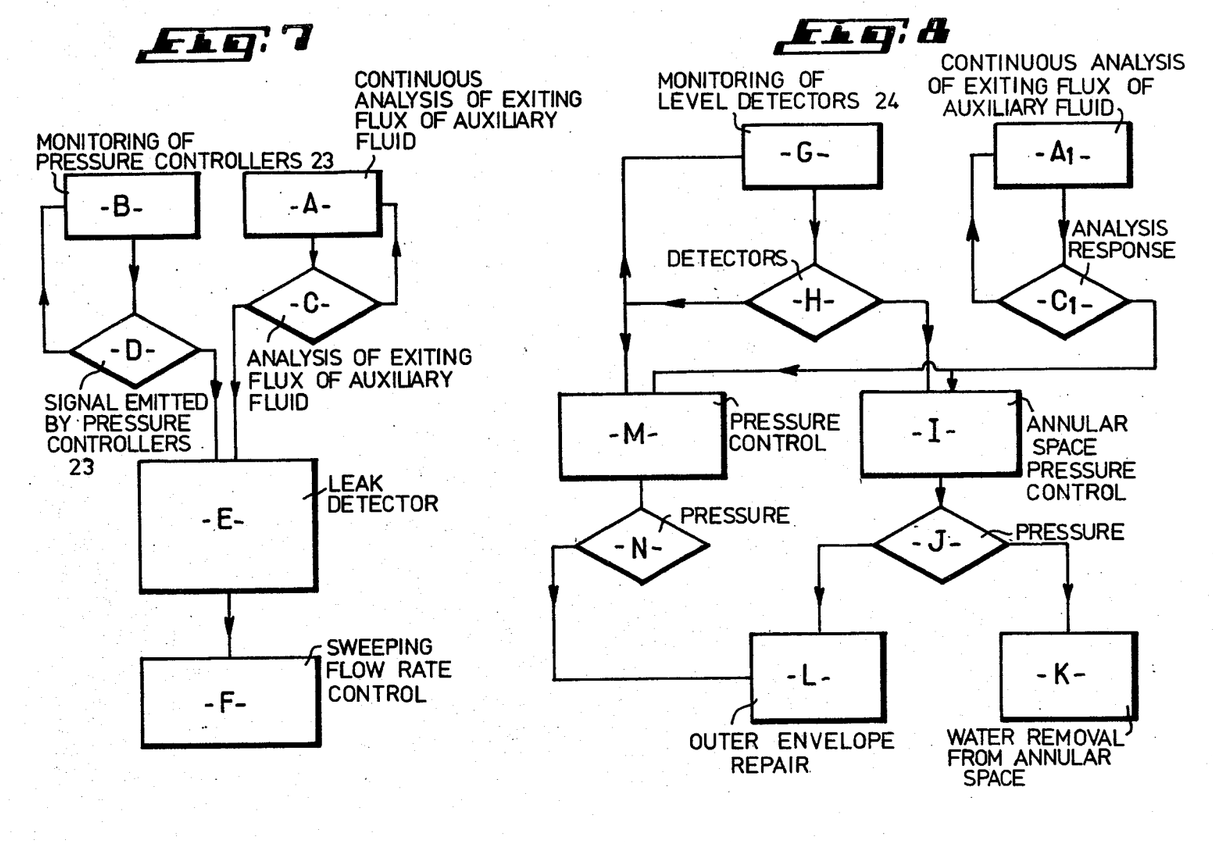
FIGS. 7 and 8 are process or data flow charts respectively illustrating the various stages of remotely detecting a leak of the conveyed fluid and a leak of the ambient fluid according to the principle of the invention.

FIG. 7 shows the flow chart or block diagram of the leak detection for the conveyed fluid. This detection consists in a continuous analysis A of the exiting flux of auxiliary fluid so as to sense or trace the presence of conveyed fluid therein, for example, in the case of propane or butane or the like, in the determination in terms of percentage of the lower limit of explodability and in a continuous watch or monitoring B of the pressostats or pressure controllers 23 mounted on each independent drain section $1a, 1b, \ldots, 1x$. When the result of the analysis C of the exiting flux of auxiliary fluid is positive, for example, if the percentage of the lower limit of explodability reaches a certain threshold (about 30%) and when at least one of the pressure controllers or pressostats 23 emits a signal D, the existence of a leak of conveyed fluid in the inner tube 2 is detected with certainty (stage E). Moreover, the localization of the signal-emitting pressostat or pressure controller permits the location of the independent duct section $1a, 1b, 1c, \ldots, 1x$ exhibiting a defect in fluid tightness.

The stage F is then started, which consists in increasing the auxiliary fluid sweeping flow rate to a value higher than 10 N m$^3$/h for removing or discharging the leaking conveyed fluid present in the annular space 11. During that step of removing the leaking conveyed fluid the auxiliary fluid is of course not re-cycled and is rejected to the atmosphere through a degassing mast or the like, for example.

In the case of a negative analysis A of the exiting flux of auxiliary fluid, the sweeping flow rate of auxiliary fluid is kept to a value of about 1 N m$^2$/h.

In the case of a negative analysis of the exiting flux of auxiliary fluid and of the emission of a signal by at least one of the pressure controllers or pressostats 23, the warning system showing the presence of a leak of conveyed fluid is not actuated but the operations of said pressostats or pressure controllers are controlled.

Thus the method of remotely detecting leaks of conveyed fluid within a pipe-line according to the invention makes it possible due to both simultaneous or concomitant local and overall leak detections, respectively, to determine and to locate with certainty the presence of a leak of conveyed fluid and only in that case to take action on the pipe-line for removing the defect in fluid-tightness thus detected.

It is of course obvious that the analysing means are adapted to the nature of the conveyed fluid and that the means of local detection comprise all the means providing the local detection of a fluid within a restricted volume or space.

The method of detecting a defect in fluid-tightness of the outer envelope of the pipe-line, i.e. the leaks of ambient fluid will now be described with reference to the flow chart or block diagram of FIG. 8.

In case of a defect in fluid-tightness of the envelope consisting of the tube 10 and the concrete 14, the ambient fluid would flow into the annular space 11 and accumulate at the low point $P_B$ of the pipe-line (shown in FIG. 1). According to the invention the presence of ambient fluid in that annular space 11 is continuously detected by the analysis of the exiting flux of auxiliary fluid and when the amount of accumulated ambient fluid reaches a certain level, the local level detectors 24 would emit a signal transmitted to the alarm means 30. Therefore the method of detecting a defect in fluid-tightness of the outer envelope of the pipe-line 11 is based on a dual simultaneous or concomitant overall and local detection, respectively, of the presence of ambient fluid within the annular space 11.

FIG. 8 illustrates the flow chart or block diagram of the detection of a leak of the ambient fluid. That detection comprises the continuous analysis $A_1$ of the exiting flux of auxiliary fluid through the determination of the presence of ambient fluid within the auxiliary fluid, for example, in the case of a submarine pipe-line, the analysis of the traces of moisture and the continuous watch or monitoring G of the level detectors 24 distributed over the whole length of the pipe-line, for example, about every 100 m.

In the case of negative responses $C_1$, H of the detection steps $A_1$, G, the outer envelope of the pipe-line does not exhibit any defect in fluid-tightness.

If there is a positive response from the analysis $A_1$ of the auxiliary fluid and the emission of a signal by at least one level detector 24, the existence of a defect in fluid-tightness of the outer envelope of the pipe-line and the accumulation of ambient fluid at a low point of the pipe-line, which is located by the position of the signal-emitting detector, are then detected with certainty. In such a case the process stage I is then performed, which consists in pressurizing the annular space to a value higher than the pressure of the ambient fluid to prevent any further ingress of ambient fluid into the annular space. It should be noted that this pressurization should be carried out along the whole length of the pipe-line.

In the case of maintaining the pressure J the water is removed from the annular space 11 by the discharge means arranged within the pipe-line and this stage is illustrated by the reference character K on FIG. 8. This water-removal stage is carried out according to a first preferred embodiment of the invention by opening the drain cocks 25 arranged on the discharge duct 15 which are operated automatically or by hand by the control means 31 (FIG. 6). According to a second preferred embodiment of the invention the removal of ambient fluid is effected through the syphon tubes $15a$, $15b$ connected to a suction device (not shown in the Figures).

If the pressure within the annular space is not maintained the repair L of the outer envelope of the pipe-line is carried out.

According to the invention, when the analysis $A_1$ of the auxiliary sweeping fluid yields a positive response $C_1$ and if no signal is detected by the watch or monitoring G of the level detector 24, it is advantageous to pressurize the annular space 11 to a pressure higher than the pressure of the ambient fluid in order to prevent any further ingress of ambient fluid into said annular space. In such a case indeed the leak of ambient fluid is small and may be easily stopped through an increase in pressure within the annular space. Moreover, it is preferable to increase the flow rate of said auxiliary fluid to carry along and remove the ambient fluid.

If the pressure N is not maintained it is then necessary to proceed with the stage L of repairing the outer envelope.

The method of and the device for detecting the defects in fluid tightness of the outer envelope of a fluid-conveying pipe-line as provided by the invention therefore permits certain detection of the presence of one or several defects in fluid-tightness of said outer envelope by the dual simultaneous detection of the presence of ambient fluid within the annular space 11.

Another significant advantage of the method and device of the invention resides in the fact that even in case of the existence of a defect in fluid-tightness of the outer envelope of the pipe-line the transfer of conveyed fluid towards or from the point P through merely pressurizing the annular space may be continued. Such a pressurizing indeed stops the ingress of the ambient fluid into the annular space and permits waiting for the end of the conveyed fluid transfer step for carrying out the repair of the outer envelope.

It should be understood as previously described that the detection of defects in fluid-tightness of the conveying tube 2 and the detection of defects in fluid-tightness of the outer envelope are performed at the same time through a continuous watch on or monitoring of the level detectors 24 and pressure controllers or pressostats 23 and through a double analysis of the exiting flux of auxiliary fluid to detect the presence of ambient fluid and of the conveyed fluid therein.

The present invention accordingly provides a fluid-carrying pipe-line in particular a submarine pipe-line for conveying liquefied petroleum gas, comprising a device for detecting defects in fluid-tightness of the conveying tube 2 proper and of the outer envelope of said pipe-line.

Therefore, the invention makes it possible to reliably and dependably determine the necessity of a manual intervention for repairing the pipe-line and also permits the location of such an intervention along the length of the pipe-line. This is very important when access to the pipe-line is difficult due to its submersion within an ambient fluid hostile to humans.

It should be understood that the invention is not at all limited to the embodiments described and shown herein which have been given by way of examples only. Thus, the nature of the insulating material, the nature of the ballasting weight may be of any kind without departing from the scope of the invention. This means that the invention comprises all the means constituting technical equivalents of the means described as well as their combinations if same are carried out according to its gist and used within the scope of protection claimed.

What is claimed is:

1. A method for detection and location of fluid leaks in a pipe-line in an ambient fluid and having a tube conveying a fluid, said tube having a wall, said method comprising the steps of surrounding the tube with a confined layer of sweeping auxiliary fluid interposed between the tube and the ambient fluid, said auxiliary fluid being a mixture of gases at least the main component of which is an inert gas at a pressure lower than the respective pressures of the conveyed fluid and the ambient fluid and being constantly kept flowing throughout the length of the pipe-line;

guiding any leak of conveyed fluid generally in a circumferential direction along the wall of said tube to accumulate said fluid into an accumulation volume divided into adjacent drain sections extending along said tube and isolated in sealing relationship from each other;

transferring the accumulated fluid to the auxiliary fluid when the pressure of the accumulated fluid within a drain section reaches a predetermined value;

sensing the presence of said conveyed fluid within said auxiliary fluid by continuous monitoring of the composition of said auxiliary fluid at one accessible end of said pipe-line and at spaced locations along said pipe-line; and emitting a signal indicative of the presence of said conveyed pipe in said auxiliary fluid as a result of said sensing.

2. A method as claimed in claim 1, further comprising the steps of detecting the presence of ambient fluid within said auxiliary fluid by sensing the presence of ambient fluid at points statistically distributed throughout the length of said pipe-line and corresponding substantially to the local low points of said pipe-line, and emitting a signal indicative of the presence of said ambient fluid in said auxiliary fluid when the level of the ambient fluid locally accumulated in the auxiliary fluid-confining space reaches a predetermined value.

3. A pipe-line for conveying a fluid submerged in an ambient fluid medium, said pipe-line comprising an inner conveying tube surrounded by an outer tube radially spaced from said inner tube and defining a continuous annular space therebetween;

leak collecting means;

leak conducting means communicating with said leak collecting means and surrounding said inner conveying tube for conducting leaks of conveyed fluid to said leak collecting means, said leak collecting means having a reduced cross-section and being divided into adjacent sections isolated in a fluid-tight manner relative to each other and extending throughout the length of said tube, each of said sections having at least a single valve means automatically opened by predetermined pressure of the conveyed fluid leaks for providing communication with said annular space surrounding said inner tube;

leak detecting means in said annular space including sweeping means for sweeping said annular space with an auxiliary fluid and analysing means for analysing the composition of the auxiliary fluid at one accessible end of said pipe-line and at spaced locations along said pipe-line; and warning means connected to said analysing means and operable when said analysing means indicates a predetermined condition.

4. A pipe-line as claimed in claim 3, wherein said leak conducting means comprises at least one layer of fabric with free or exposed loops, resistant to said conveyed fluid and continuously wound about said inner tube and said leak collecting means comprises a substantially trough-shaped duct in said fabric, sealed with a porous material.

5. A pipe-line as claimed in claim 4, wherein said fabric consists of glass fibre and said porous material consists of polyurethane foam with burst cells.

6. A pipe-line as claimed in claim 3, wherein said sweeping means comprises a source of auxiliary fluid, feeding means for feeding and recycling said auxiliary fluid at a variable flow rate and an adjustable pressure, at least one flow duct for said auxiliary fluid in said annular space and extending substantially along the whole length of said pipe-line, and means for selectively removing said auxiliary fluid.

7. A pipe-line as claimed in claim 3, further comprising a plurality of detectors connected to said warning means, at least one of said detectors being located in each section of said leak collecting means.

8. A pipe-line as claimed in claim 7, wherein each of said detectors consists of a pressure sensor.

9. A pipe-line as claimed in claim 3, further comprising means for detecting leaks of ambient fluid including a plurality of ambient fluid level detectors connected to said warning means for sensing the presence of ambient fluid in said annular space, said ambient fluid level detectors being located in said annular space, distributed throughout the length of said pipe-line at positions corresponding substantially to the local low points of said pipe-line, and means for removing leaking ambient fluid from said annular space.

* * * * *